United States Patent [19]

Bass et al.

[11] Patent Number: 5,353,237
[45] Date of Patent: Oct. 4, 1994

[54] SYSTEM FOR INCREASING EFFICIENCY OF CHEMICAL TREATMENT

[75] Inventors: G. N. Bass, Sachse; Carl D. McBride; Greg Maddux, both of Garland; John L. Cayias, Richardson; Johnny M. Reinschmidt, Garland; Kurt P. McCaslin, Carrollton, all of Tex.

[73] Assignee: Oryx Energy Company, Dallas, Tex.

[21] Appl. No.: 904,432

[22] Filed: Jun. 25, 1992

[51] Int. Cl.⁵ ............................................. G06F 15/42
[52] U.S. Cl. .................................... 364/502; 364/500; 364/496; 364/580
[58] Field of Search ............... 364/500, 501, 502, 579, 364/580, 496; 366/132; 166/250; 137/92

[56] References Cited

U.S. PATENT DOCUMENTS

| | | | |
|---|---|---|---|
| 4,197,576 | 4/1980 | Sanchez | 364/501 X |
| 4,353,482 | 10/1982 | Tomlinson et al. | 364/479 X |
| 4,358,822 | 11/1982 | Sanchez | 364/501 X |
| 4,538,221 | 8/1985 | Crain et al. | 364/502 X |
| 4,635,723 | 1/1987 | Spivey | 166/250 |
| 4,648,043 | 3/1987 | O'Leary | 364/502 X |
| 4,783,269 | 11/1988 | Baba et al. | 364/500 X |
| 4,866,632 | 9/1989 | Mead et al. | 364/501 |
| 4,867,192 | 9/1989 | Terrell et al. | 137/92 |
| 4,897,797 | 1/1990 | Free, Jr. et al. | 364/502 X |
| 4,918,659 | 4/1990 | Bragg et al. | 366/132 |
| 5,058,043 | 10/1991 | Skeirik | 364/500 X |
| 5,060,167 | 10/1991 | Ticcion; et al. | 364/500 X |
| 5,104,527 | 4/1992 | Clinkenbeard | 364/500 X |
| 5,132,918 | 7/1992 | Funk | 364/501 |

OTHER PUBLICATIONS

Greenslade, J. G., "Scada system overseas Canadian H₂S field, pipelines," *Oil & Gas Journal,* May 25, 1992, pp. 33–39.
Argo, M. A., "Small PCL revamps production battery control," *Oil & Gas Journal,* May 25, 1992, pp. 46–49.
Nalco Chemical Company brochure for "Cooling Water Control", 1988.
Strome, R. K. and K. P. Beal, "Heavy-Oil Dehydration Facility Retrofitted With Computer Monitoring", SPE 21535, presented at the Int'l Thermal Operations Symposium in Bakersfield, Calif., Feb. 7–8, 1991.
*Nalco Vispatch,* vol. 5, No. 1, Feb. 1987, p. 1.
C-E Natco advertisement entitled "Here's What You Can Get at Your C-E Natco Sales/Service Center", Composite Catalog, pp. 704–706. date unknown.
HSMC/Metrol advertisement entitled "HSMC Metrol Production Systems," Composite Catalog, p. 2736. date unknown.
"L.A.C.T. and Vapor Recovery Units," Composite Catalog, p. 460.
Nalco brochure entitled "Chem Mate-A Breakthrough in Treatment Control" 1989.

*Primary Examiner*—Kevin J. Teska
*Attorney, Agent, or Firm*—Pravel, Hewitt, Kimball & Krieger

[57] ABSTRACT

Apparatus and method for decreasing chemical requirements for chemicals injected into a stream a low concentrations, such as for dehydration of crude oil, are provided. An algorithm is used to provide a signal to decrease chemical injection rate of a variable rate pump if the water content of the treated oil has not exceeded a preset value in a preset time and to increase chemical injection rate if the water content of the treated oil is exceeded within a preset time. The algorithm allows the control system to learn from previous experience.

25 Claims, 10 Drawing Sheets

SYSTEM FOR INCREASING EFFICIENCY OF CHEMICAL TREATMENT

SPECIFICATION

1. Field of the Invention

This invention relates to controlling the addition of low concentrations of chemicals to fluid streams, such as for removal of water from crude oil produced from oil wells, and more particularly to utilization of sensor measurements in a computer program to minimize the amount of chemicals added for effective treatment, such as for dehydration of crude oil.

2. Background of the Invention

Chemicals are added to flowing streams in oil production operations to achieve several purposes. Chemicals are used for control of: corrosion, deposition of mineral scales from water, deposition of paraffin from crude oil and growth of bacteria. Chemicals are also used to assist in removal of oil and solids from water streams before disposal and to de-emulsify oil and water. Low concentrations of chemical, less than about 1000 parts per million, are typically required for such purposes. In all these types of chemical applications, the concentration of chemical required to achieve a desired level of results is selected based on: tests conducted in the laboratory with a range of concentrations of chemical, or results measured and observed in field operations, or both. The sale of chemicals for these various applications totals hundreds of millions of dollars per year. Among the more widely used chemicals are those for corrosion control and those for de-emulsification of water from crude oil, also called dehydration of crude oil.

When crude oil is produced from wells, water or brine is very commonly produced along with the oil. The water becomes emulsified in the oil as the mixture flows into a well and to the surface. To sell the oil from the production facility, it is necessary to remove most of the water, or to dehydrate the oil. Chemicals are often added to the stream to aid the de-emulsification. A heater to increase the temperature of the oil and a vessel for allowing oil and water to separate are commonly used along with the chemicals.

In the application of chemicals to treat the oil for dehydration, as well as in all the other applications of chemicals cited above, it is important to minimize the amount of chemical used. Lower chemical usage can result in significant savings in operating costs. The rate of flow, fluid temperature and composition of streams commonly present in oil production operations often vary widely with time, however. Rate of flow may vary because of slugging flow into a facility, for example. Variations in composition of incoming fluids may vary from equipment failure, variations in fluid type flowing into wells, human error or other causes. The rate of addition of chemical to the streams, therefore, should vary widely with time if desired results are to be achieved and over-treatment with chemical is to be avoided. In the past, manual control of rate of chemical addition has been used. Often, the rate of chemical injection is set at a constant value sufficient to treat the stream under the most adverse conditions expected. Manual adjustments are made infrequently, and often do not respond to conditions which would require less chemical injection. These procedures are expensive in terms of manpower and often result in excessive use of chemicals.

Remote measurement and control methods have been applied in some oil production operations. Instruments for measurement of flow rate, pressure and differential pressure, temperature, water content of oil, corrosion rate and other variables are available. Measurements of differential pressure between two points in a flow stream can be used to indicate scale or paraffin formation or bacterial growth in streams. Remote control of valves, pumps and other flow control equipment has been developed. Supervisory control and data acquisition (SCADA) systems have been deployed over some entire fields, with radio or hard wire communication between remote and central units. In other areas, there is little or no automation or communication facilities, so manual controls and portable test instruments are necessary.

Computer monitoring of some field facilities has been developed with on-site computers. A large facility used for oil dehydration is described in the paper "Heavy-Oil Dehydration Facility Retrofitted with Computer Monitoring," SPE 21535, Soc. of Pet. Engrs., Richardson, Tex., 1991. Operation of this facility is assisted by data acquisition in various points of the process and display or storage of the data. One of the variables measured and monitored in this facility is water content of the effluent oil stream. Operating conditions must be manually altered if water content is too high or too low.

Similarly, corrosive conditions can change in streams associated with oil production. This may occur because of changing fluid composition, for example. Corrosion inhibitors and other chemicals are sometimes injected downhole where produced fluids enter the well, to prevent corrosion and other effects in the tubing of the well. Fluid rates and fluid composition entering the well may vary with time. As a result, required rates of corrosion inhibitor injection to keep the corrosion rate of metals below an acceptable level change. Often, these changes in the fluid streams with time are unpredictable. Therefore, manual changes in chemical injection rates require close supervision and control to maintain the proper level of chemical in the system.

Short-term excursions outside a desired range of the variables being controlled by chemical injection are often acceptable. This is true in the case of chemical-assisted dehydration of crude oil, for example, because the water content of large volumes of oil is averaged. Similarly, for processes including chemical treatment to assist in improving water quality. In the case of corrosion, corrosion rate averaged over a long time interval is important, not an instantaneous rate. For buildup of scale, paraffin, or bacteria, flow restriction builds gradually, not instantaneously, if chemical concentration is below the needed range, and the effects are at least partially reversible if chemical concentration is increased. In each application of chemical added to a stream at low concentration, there is an effective amount of chemical addition to maintain the variable to be controlled within acceptable limits over the long term. The acceptable limits will vary with circumstances. Acceptable water content of dehydrated crude oil is dependent on the contract terms for selling the oil. An acceptable corrosion rate is dependent on the expected lifetime of the equipment being protected, for example.

In processes employing injection of chemicals at low concentration into streams which vary unpredictably in composition or flow conditions, such as the process to dehydrate crude oil and the other applications discussed, there is a need for apparatus and a method for minimizing the amount of chemical required for achieving results within acceptable limits when averaged over time. For crude oil dehydration, for example, the result is an acceptable level of water content of the treated crude oil. There should also be provided apparatus and method for storage of data regarding chemical usage and results, for retrieval or transmission of the data and for control of those treating conditions which can be changed to affect total treating cost. A system which "learns" from recent history of the controlled variable exceeding a preset value is needed.

SUMMARY OF THE INVENTION

Method and apparatus are disclosed for controlling the rate of chemical injection into a stream to control a variable which is measured downstream of the point of chemical injection. A control signal is provided to a variable rate pump to vary the rate of chemical injection depending on the amount of time since the variable exceeded a preset value. In one embodiment, the method and apparatus are used to control de-emulsifier injection into a crude oil stream to be dehydrated. The water content of the crude oil after passing through the dehydration facility is measured and compared to a preset value. The flow rate of crude oil is measured and used to calculate a base rate of chemical injection, and the base rate is multiplied by an economizer function which is determined by an algorithm which takes into account the time in which water content has not exceeded a pre-set value.

DETAILED DESCRIPTION OF PREFERRED EMBODIMENT

Figure 1:
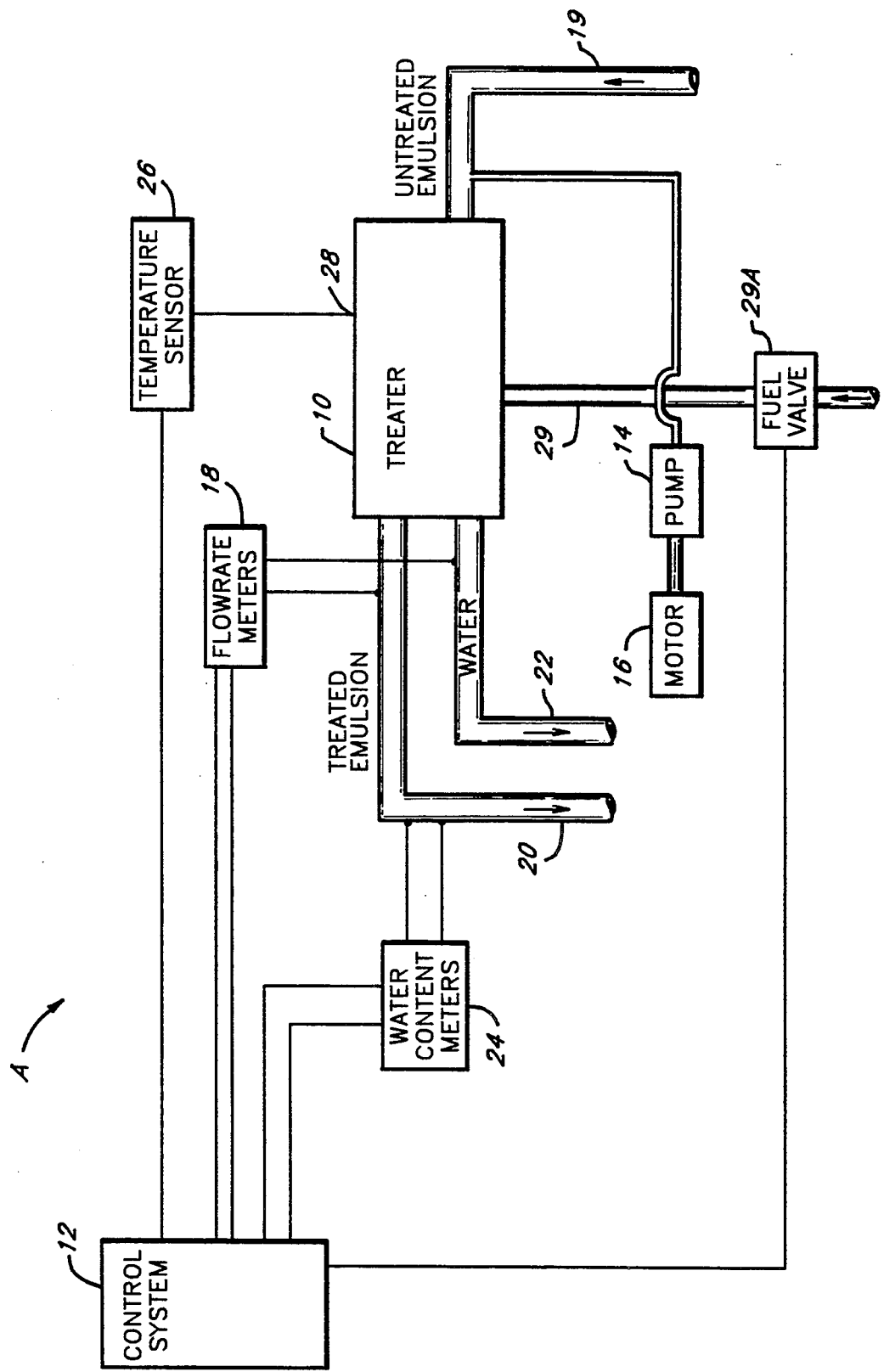
FIG. 1 is a diagram of major apparatus components of a crude oil dehydration system with an automated chemical injection system.

Referring now to FIG. 1, an automated chemical injection system A according to the present invention includes a heater treater 10, various means for detecting conditions in the treater and emulsion, and a microprocessor-based control system 12. Untreated emulsion flows into the treater 10 through inflow pipe 19. The emulsion is treated by injection of a demulsifier chemical to separate water from the oil. As the emulsion is treated, water separates from the oil and settles at the bottom of the treater. When sufficient water accumulates, a dump valve opens, allowing the water to flow out of the treater through a water outflow pipe 22 during the water dump cycle. Similarly, when sufficient crude oil accumulates in the treater 10, a second dump valve executes a crude oil dump cycle. Treated emulsion then flows out of the treater 10 through treated emulsion outflow pipe 20.

Pump 14 driven by motor 16 injects demulsifier chemical into the untreated emulsion as the emulsion flows into the treater. The rate of chemical injection depends on the speed of motor 16. The motor speed is controlled by control system 12, which includes a microprocessor to receive data, perform calculations, and control the system operations. The control system further includes a set of buffers, registers, counters, and memory to provide an interface for external sensors and for storage and accumulation of data. Thus, the control system 12 adjusts the flow of the demulsifier by varying the pump rate according to the conditions in the treater 10 and of the fluid flowing out of the treater 10.

Treater 10 is heated by fuel to a burner in the heater (not shown), the fuel flowing through pipe 29. The rate of flow of fuel may be varied by fuel control valve 29A, which is controlled by a signal from control system 12.

Means for detecting variable conditions include flow rate meters 18 for outflow pipes 20 and 22. Each flow rate meter 18 generates electronic pulses according to the flow rate of the fluid in the pipes 20 and 22. A pair of counters accumulate pulses to calculate fluid flow rate from the treater.

At least one water content meter 24 is connected to the emulsion outflow pipe. Two or more different meters 24 may be selectively used to measure water content of fluid flowing out of treater 10 during oil dump cycles. Each meter may measure the water content of the fluid by different physical measurements, and the operator may choose which sensor's data to use. The outputs of water content meters 24 are connected to control system 12.

Temperature sensor 26 having temperature probe 28 placed in treater 10 measures the temperature of the fluid. Probe 28 provides an analog signal to an analog-to-digital converter (ADC) (not shown), which converts the analog signal into a digital value proportional to the measured temperature in treater 10. The ADC then provides digital output to control system 12.

Figure 2:
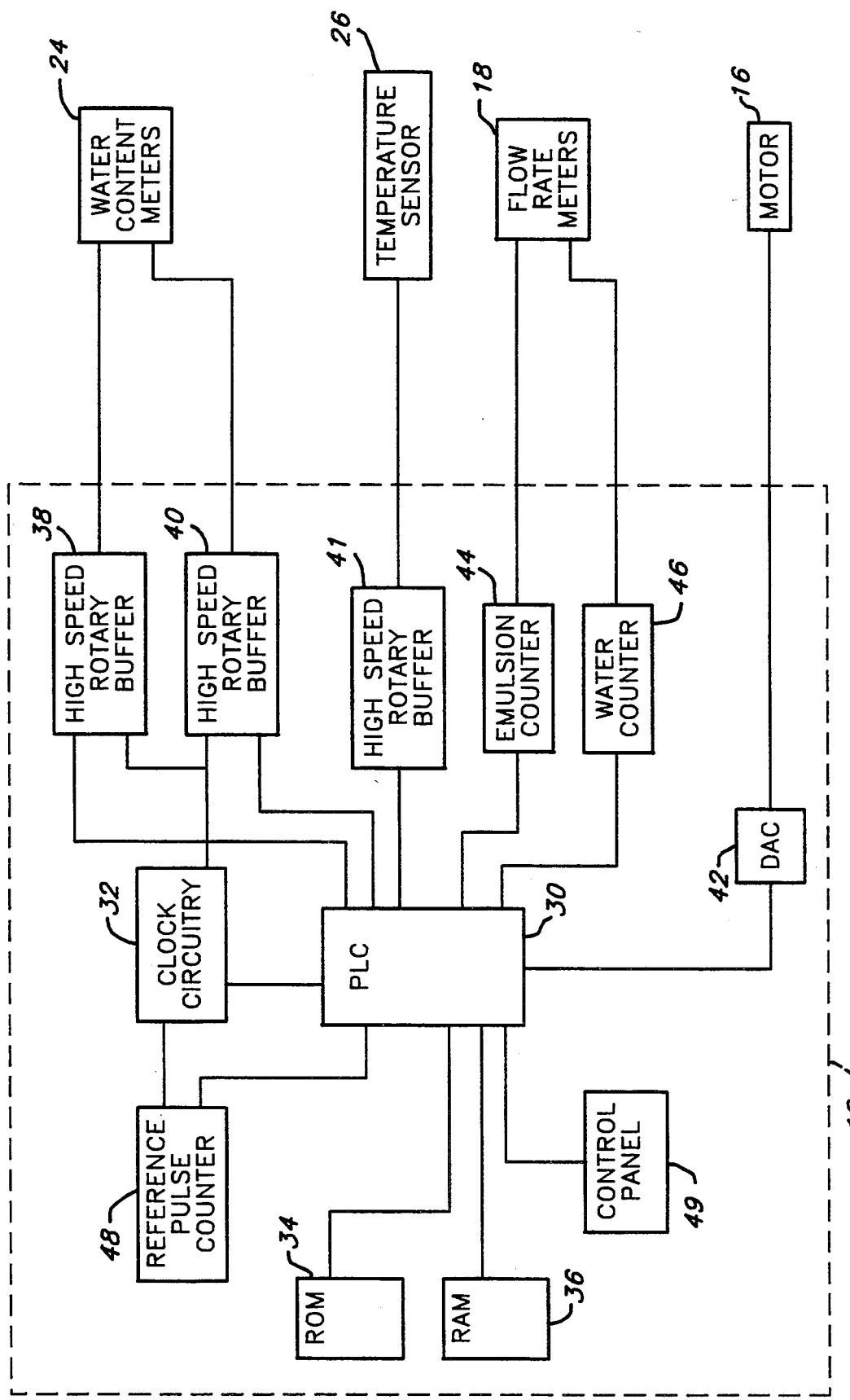
FIG. 2 is a diagram of a control system apparatus with input sensors and output control motor.

Referring now to FIG. 2, control system 12 includes microprocessor 30, which may be contained in a Toshiba EX100 PLC, which receives sensor and meter data, performs calculations, and controls the rate of chemical injection. Clock circuitry 32 is connected to microprocessor 30 and generates timing and control signals for microprocessor 30 and the other system components. Control system 12 further includes read-only memory (ROM) 34, which contains the system software, and random access memory (RAM) 36, which stores data generated and received by control system 12, connected to microprocessor 30.

High-speed rotary buffers 38 and 40, controlled by microprocessor 30 and clock circuitry 32 store water content data received from each water content meter 24 during oil dump cycles. A third high-speed rotary buffer 41 stores data received from temperature sensor 26, and is also controlled by microprocessor 30 and clock circuitry 32.

Rotary buffers may be portions of the RAM associated with a pointer. When the buffers are reset, the pointer moves to an initial address in the RAM. When data are stored at the initial address, the pointer increments to indicate the next address. When data are stored at the new address, the pointer increments again to a new address. This continues until data are stored at the last address designated for the buffer. The pointer is then reset to the initial address, and first data received are overwritten. Thus, each rotary buffer always contains the most recent data received.

In one embodiment, clock circuitry 32 activates the water content buffers only when an oil dump is in progress. Unlike the water content buffers, however, the temperature buffer is updated continuously, regardless of oil dump cycles. For the water content buffers, the storage interval is commonly about 0.1 second, and the storage interval is frequently about 2 seconds for the temperature buffer. These are example values, since the intervals can be set according to specific site and operator's preferences. When the oil dump ends, the buffers are disabled and maintain the last sets of data received. Each high-speed rotary buffer 38, 40, and 41 is connected to microprocessor 30 so that data can be read from each buffer.

The outputs of flow rate meters 18 are connected to emulsion counter 44 and water counter 46, which count pulses received from the flow rate meters 18. Reference pulse counter 48 counts pulses generated by clock circuitry 32 and indicates when the microprocessor 30 should read and store emulsion counter 44 and water counter 46 values. Flow rate counter values are often read about every 15 minutes, but this interval may be changed as needed. Control system 12 also includes a set of buffers connected to the sensors and meters and microprocessor 30 to pass data to and from microprocessor 30.

Microprocessor 30 provides an output signal to control chemical injection rate into treater 10. Digital-to-analog converter (DAC) 42 receives the digital signal from microprocessor 30 and generates a proportional analog signal. The analog output of the DAC is connected to a control input of motor 16 to control the motor's speed. By altering the motor speed corresponding to the DAC signal, the control system varies the rate of pump 14.

Control panel 49 can be used to initiate or interrupt various microprocessor 30 operations. Control panel 49 may have a LED or any other type of display to present requested data to the operator. Using control panel 49, the operator can clear the data tables, specify which of the water content meters 24 to use, or override the system and set the chemical injection rate manually. Operating parameters may also be provided through control panel 49 to control system 12. In addition, control panel 49 includes a port to connect with a computer. When a computer is connected to control panel 49, microprocessor 30 can transfer the information contained in the data tables to the computer, which can then store the information in some permanent medium, such as a floppy disk. Or, the information can be transmitted via radio telemetry or hard wire to another location. Using this feature, accurate records of chemical usage and treater conditions over several weeks, months, or years can be compiled.

Using the above system at fixed rates of chemical injection and a fixed temperature, average flow rate and water content may be monitored, from which the microprocessor may be used to calculate a relationship between base demulsifier injection rate, flow rate through the facility and water content. This relationship can be expressed as an equation used to calculate a base rate of chemical injection vs. flow rate through the facility. This relationship may also be entered into the microprocessor in the form of an equation developed from experience in other facilities operating under similar circumstances or from laboratory-derived data. From this equation, the control system adjusts the injection rate according to variations of flow rate, using the flow rate meters in the outflow from the treater. Reading the flow rate counters periodically provides an average flow rate. The temperature sensor reads the temperature within the treater at preset intervals and stores the temperature values in the high rate rotary buffer for averaging.

To optimize de-emulsifier usage, the base chemical injection rate is multiplied by an economizer term. The economizer term is a unitless variable based on the number of time units that have elapsed since the water content in the emulsion exceeded a preset value. As time passes without the water content exceeding the preset threshold, the economizer term becomes progressively smaller, causing the demulsifier injection rate to drop proportionally. The economizer term is used because, as the water content of the fluid remains stable for long periods, the fluid in the treater becomes more homogeneous, reducing the need to treat short-term high water concentrations. Therefore, the need for added demulsifier as a safety margin decreases, and the system can gradually reduce the injection rate. Multiplying the base chemical injection rate by a gradually decreasing economizer value implements the gradual reduction in rate of chemical injection of this invention.

In one embodiment, the economizer term e(t) is determined according to an exponential equation:

$$e(t) = b^{x(t)}$$

where b is a number greater than zero and less than one. Preferably, b is between about 0.9 and 1.0. The value of b is established by the operator. If the value of b is reduced, the economizer term e(t) shrinks faster with each time increment, thus causing the chemical injection rate to drop faster. The time function x(t) is the number of increments of a timer, each increment of a preset length of real time, since the measured water content exceeded a preset value. When water content in the outflow oil stream exceeds the preset threshold, the timer value x(t) may be reset to zero, causing the economizer term to have a value of 1.0, so that the base chemical injection rate is used. As time passes while the water content remains below the threshold, the value of x(t) increments with time and the economizer term shrinks exponentially, reducing the chemical injection rate into the treater. Consequently, the water content is maintained below the threshold, yet the chemical injection rate is adjusted to minimize the injection of unnecessary demulsifier.

Although the economizer term conserves demulsifier, the rate at which the economizer term decreases must adapt to the changing characteristics of the emulsion and the conditions in the treater. If the economizer term causes the injection rate to drop too slowly, unnecessary demulsifier is provided to the treater. On the other hand, if the economizer term reduces the chemical injection rate too quickly, the water content of the oil flowing out of the system may rise to unacceptable levels. Therefore, the rate at which the economizer term reduces the injection rate is adaptable, so as to remove the required amount of water from the emulsion without needless use of the de-emulsifier chemical.

In one embodiment, the rate at which the economizer term decreases is "learned" from recent experience related to the frequency at which the water content exceeds the preset limit. The rate at which the economizer term drops is controlled by the economizer relative reaction time (ERRT), which is a time unit which indicates the length of the real time interval between increments of the timer value x(t). The value of ERRT in real time is determined by the timer, but it may be set at a preset value, which may be about 1 second, for example. Like the economizer term, the ERRT value varies and adapts according to the length of time that passes between the water content exceeding the preset threshold. Because it indicates the length of the real time intervals between increments of the timer, it controls the rate at which the economizer term shrinks. Thus, if the ERRT value is large, the x(t) timer value increments relatively rarely, and the economizer drops slowly. On the other hand, if the ERRT value is small, the x(t) timer value increments comparatively frequently, and the economizer term drops quickly. The ERRT can also be adjusted according to a simple algorithm so that if the time period since the water content exceeded the preset threshold is short, the ERRT value increases, and if the time period is long, the ERRT value decreases.

Figure 3:
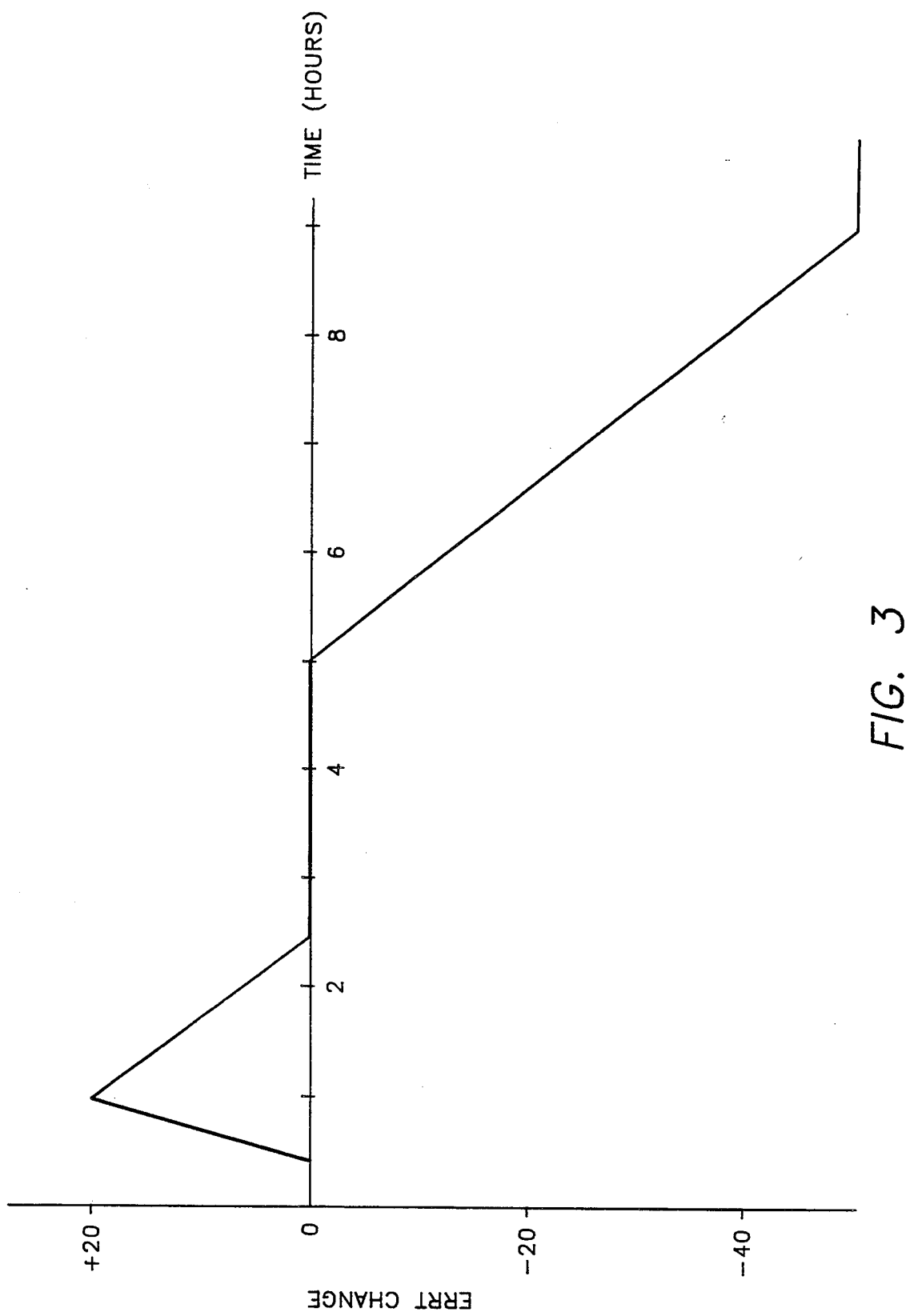
FIG. 3 is a graph of changes in the economizer relative reaction timer during operation of the invention.

Referring to FIG. 3, the graph shows an example of changes in the ERRT which may be programmed by the operator. If the water content exceeds the threshold within an hour after resetting the economizer term, the economizer term is dropping too rapidly and the treater is not receiving enough demulsifier chemical. If the threshold is crossed within one-half hour, however, the economizer term has not yet had an effect, so the ERRT is left the same. On the other hand, if the water content still exceeds the threshold after one-half hour, the economizer term may be dropping too rapidly, so the ERRT must be increased. Thus, if the water content exceeds the threshold in less than one hour but more than half an hour, the ERRT is increased according to a ramp function from zero up to 20. On the other hand, if the water content only exceeds the threshold every nine hours or more, the operator may believe that the ERRT value is too conservative and the treater is receiving too much demulsifier. Therefore, the ERRT value must be decreased significantly, maybe as much as 45. But if the water content exceeds the threshold every two-and-a-half to five hours, the oil quality may be acceptable and the amount of demulsifier chemical optimized, so the ERRT value should remain more or less constant. Between one and two-and-a-half hours or five and nine hours, the ERRT is adjusted according to ramp functions that increase or decrease the ERRT as a function of the time since the last water content threshold crossing.

In sum, the actual demulsifier injection rate is dependent upon the value provided by the ERRT. Data received from the sensors and meters establish the raw demulsifier injection rate. If the economizer term has not been recently reset due to excessive water content, the economizer term decreases the demulsifier rate to reduce the amount of unnecessary chemical injected into the treater. How much the injection rate decreases depends upon how much time has passed since the economizer term was reset and the value provided by the ERRT. The value provided by the ERRT, however, varies according to how effectively the water content is controlled and how much unnecessary demulsifier is added to the system. Consequently, the adaptable ERRT value and economizer term allow the control system to provide a changing demulsifier injection rate adjusted to control the water content of the emulsion minimizing the injection of unnecessary deemulsifier into the treater.

The economizer function may have other forms than exponential. For example, the function may be in the form:

$$e(t)=a/[a+x(t)],$$

where a is a constant. In this case, when the preset value of water content is exceeded x(t) becomes 0 and the rate of chemical injection becomes the base rate.

The rate of chemical injection after the preset value of water content is exceeded and x(t) becomes equal to 0 may also be programmed to increase to values less than the base injection rate. Partial step functions or ramp-up functions may be used, for example.

After data on chemical usage and water content of the oil or emulsion stream have been collected for an adequate time, preferably for at least several days, the average temperature of the treater can be changed by a signal from control system 12 to fuel valve 29A. Valve 29A controls gas or other fuel supply to a burner within heater treater 10. Changes in average temperature within treater 10 affect chemical usage, which is measured at the new value of average temperature for an adequate time. Changes in cost of fuel and chemical are compared. Systematic stepwise changes in temperature may be programmed in control system 12 over a range of temperatures to determine minimum cost conditions for operating automated chemical injection system 5, using data on operating variables stored in control system 12.

There are particular advantages of providing automated chemical injection system 5 as a portable unit in some oil-producing areas The unit can then be used as means for establishing optimized treating conditions at a facility where oil is to be dehydrated. Sensors are attached to flow lines of the facility and to the control system 5, which may be trailer-mounted. The system can also be used temporarily at a facility to monitor or increase efficiency of operations. Alternatively, the system can be installed as a permanent part of a dehydration system.

Although the detailed description above pertained only to chemical injection for crude oil dehydration, the same method and type of computer apparatus can be applied to the injection of chemicals for control of corrosion, deposition of mineral scales from water, deposition of paraffin from crude oil, growth of bacteria in flow systems, removal of oil and solids from water and other processes requiring low concentrations of chemicals. The sensor employed will be selected depending on the variable to be controlled. The sensor will be placed downstream from the point of chemical injection at a location for detecting the effectiveness of the chemical. For corrosion control, for example, the sensor measuring rate of corrosion will be placed downstream from at least a part of the system being protected from corrosion by chemical injection. For control of scale deposition, the sensor may be placed in the stream at a point where scale deposition can occur. For detection of any type of process which can plug a filter, a sensor detecting differential pressure can be used. For a process affecting turbidity of water, a sensor detecting clarity of the stream can be used. These types of sensors are examples, while the art of sensors is broad and highly developed and is known to those skilled in the art of instrumentation.

Referring now to FIGS. 4A–4E, a flow chart for the program executed by the microprocessor 30 to implement an embodiment of the methods described above for crude oil dehydration is shown. The program may conveniently be developed by use of ladder logic and executed on a programmable logic controller (PLC). Use of a PLC is preferred if controller 12 is to be installed in a portable unit or other unprotected environment. If the program is to be executed by computer hardware in a protected environment and in communication with remote sensors, any convenient computer and language may be used.

Figure 4A:
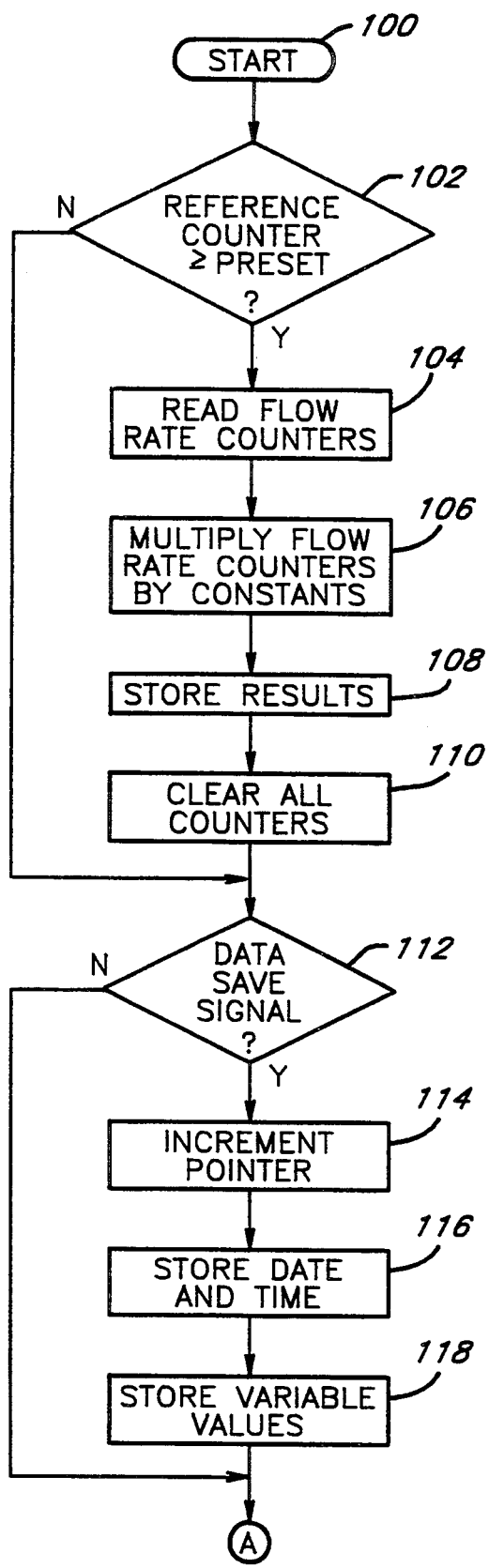
FIG. 4, comprising FIGS. 4A–4E, describes a flow chart of software for controlling a microprocessor to carry out the invention.

The program begins at step 100 in FIG. 4A, and control proceeds to step 102 in which the processor 30 reads the current reference pulse counter 48 value and compares it to a preset time value provided by the user and stored in the system RAM 36. The reference pulse counter 48 receives regular pulses from the clock circuitry 32 and accumulates them over time. The preset value determines the interval between oil and water flow rate determinations. If the reference pulse counter 32 value has not yet reached the preset value, control proceeds to step 112. If the preset value has been reached, control proceeds to step 104 and microprocessor 30 reads the values contained in emulsion flow rate counter 44 and water flow rate counter 46. Control then proceeds to step 106 where microprocessor 30 multiplies emulsion flow counter 44 and water flow counter 46 values by a pair of constants stored in system RAM 36 to derive the rate of flow in conventional units, such as barrels per day, for each fluid. Control proceeds to step 108 and the emulsion flow and water flow rates are stored. Control then proceeds to step 110 and emulsion counter 44, water counter 46, and reference pulse counter 48 are all cleared and begin counting again.

Control then proceeds to step 112 to determine whether the clock circuitry 32 has asserted a data save signal. At timed intervals set by the operator, the clock circuitry asserts a data save signal, indicating that system data should be stored in system RAM 36 for record or research purposes. If the data save signal has not been asserted, control proceeds to step 120. If the data save signal has been asserted, control proceeds to step 114 where a data table pointer is incremented. Control then proceeds to step 116 and the date and time of the current data save operation is stored in the data table at the location designated by the pointer, and control then proceeds to step 118 where the pertinent variable values, including the chemical injection rate, treater temperature, water content, emulsion and water flow rates, and the economizer value are stored in the data table memory. The list of variables to be stored can be determined by the operator to suit his research or records.

Figure 4B:
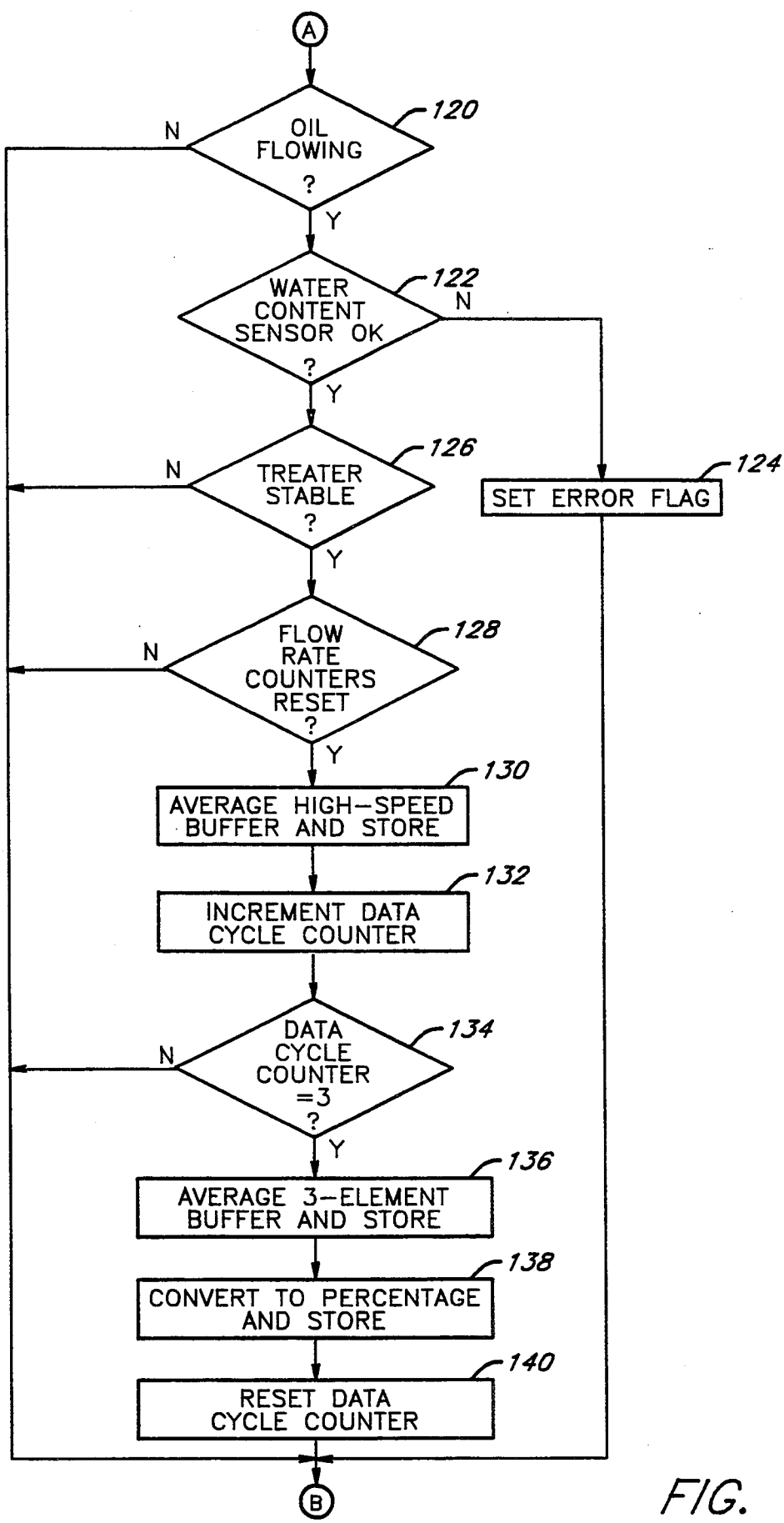

Referring now to FIG. 4B, control proceeds to step 120 where it is determined whether an oil dump cycle is occurring. Oil dump cycles are detected by a paddle switch positioned in the emulsion outflow pipe 20 and connected to the control system. If oil emulsion is not flowing, control proceeds to step 142. If oil emulsion is flowing, control proceeds to step 122 to determine whether the water content meters 24 are functioning properly. If not, control proceeds to step 124 and an error flag is set to prevent any calculations using the bad data. If meters 24 are functioning, control proceeds to step 126 to determine whether the treater contents have had time to stabilize. While the emulsion remains in the treater, the oil emulsion tends to stratify so that emulsion with high water content settles below emulsion with low water content. Consequently, water content data at the initiation of the dump cycle is unreliable, so the control system allows a few seconds for the treater contents to de-stratify and stabilize after the initiation of the oil dump cycle. If the stabilization period has not yet passed, control proceeds to step 142, and if the stabilization period is over, control proceeds to step 128 where the current contents of the appropriate water content buffer are read and the values are averaged. Control proceeds to step 130 and the average value of the buffer data is stored in a three-element buffer (not shown). Control then proceeds to step 132, and a data cycle counter (not shown) increments, which indicates how many oil dump cycles have occurred since a new average water content value was established. Control proceeds to step 134, and if the data cycle counter value is three, then control proceeds to step 136 and the last three water content average values stored in the three element buffer are averaged. Control proceeds to step 138 where the average of the three buffer values is converted to a percentage figure of water content in the fluid and stored. By averaging the three water content values, anomalous water content readings from unusual oil dumps are prevented from causing unnecessary variations of the chemical injection rate. The data cycle counter is then reset in step 140.

Figure 4C:
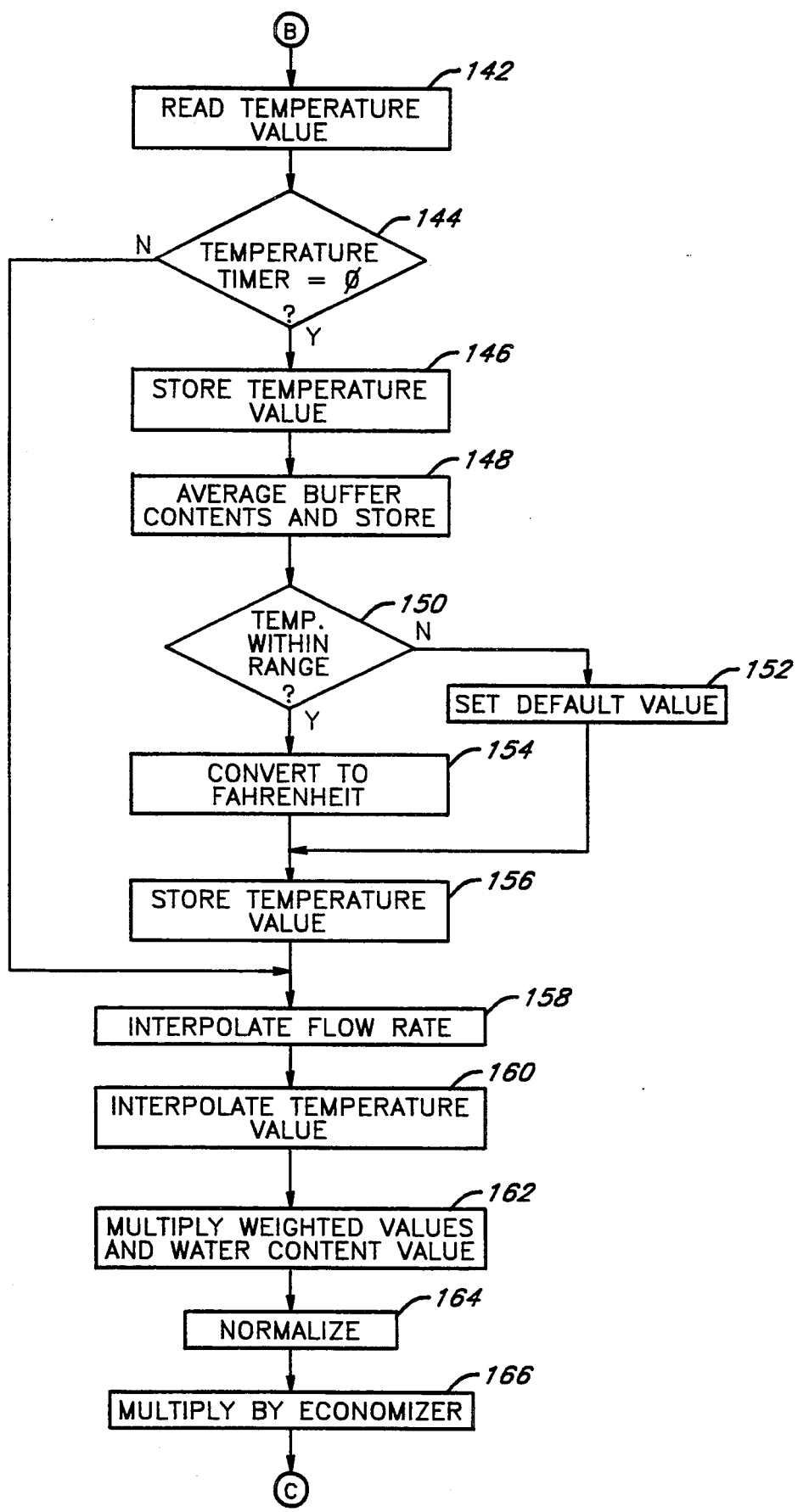

As shown in FIG. 4C, control proceeds to step 144 to determine whether a temperature timer (not shown) has timed out, indicating that new temperature data should be taken. The temperature timer setting is preset by the user. If the timer has timed out, control proceeds to step 148 and the values stored in the temperature high speed rotary buffer 41 are averaged and the result is stored. Control proceeds to step 150 to determine whether the data received from temperature sensor 26 is within in a preset range of values to indicate whether the data received from temperature sensor 26 is reasonable or a probable error. If the temperature sensor 26 value exceeds the limits of the preset range, control proceeds to step 152, and a default temperature value is retrieved from memory and is provided as the appropriate temperature value. If the temperature sensor 26 value is acceptable, the received average temperature value is converted to Fahrenheit units in step 154 and the appropriate temperature value is stored in step 156.

Control proceeds to step 158 where the fluid flow rate is interpolated according to a linear equation with a zero intercept to generate a value directly proportional to the fluid flow, which is stored and later used for calculating the chemical injection rate. The linear interpolation equation is a purely subjective evaluation of how responsive the chemical injection rate should be to the fluid flow rate relative to the other variables. Each operator has specific preferences and methods, and the interpolation function can be varied accordingly. Control then proceeds to step 160 where the temperature reading is used to interpolate a particular weighted temperature value according to another linear equation having a negative slope. The weighted temperature value is inversely proportional to the temperature in the treater, and is also stored. Like the flow rate function, the exact temperature function is also a subjective decision for the operator. Control then proceeds to step 162 to determine the product of the weighted oil flow value, the weighted temperature value, and the water content percentage. The water content percentage is not subjected to a weighing interpolation, thus receiving a relative weight of one and a directly proportional response. Control then proceeds to step 164 where the figure derived in step 162 is multiplied by a normalizing constant to provide the appropriate units and arithmetic. Control proceeds to step 166 where the normalized chemical rate is multiplied by the economizer value determined and stored in the previous cycle and the product is stored. The resulting figure is the preliminary chemical rate to be injected into the treater.

Figure 4D:
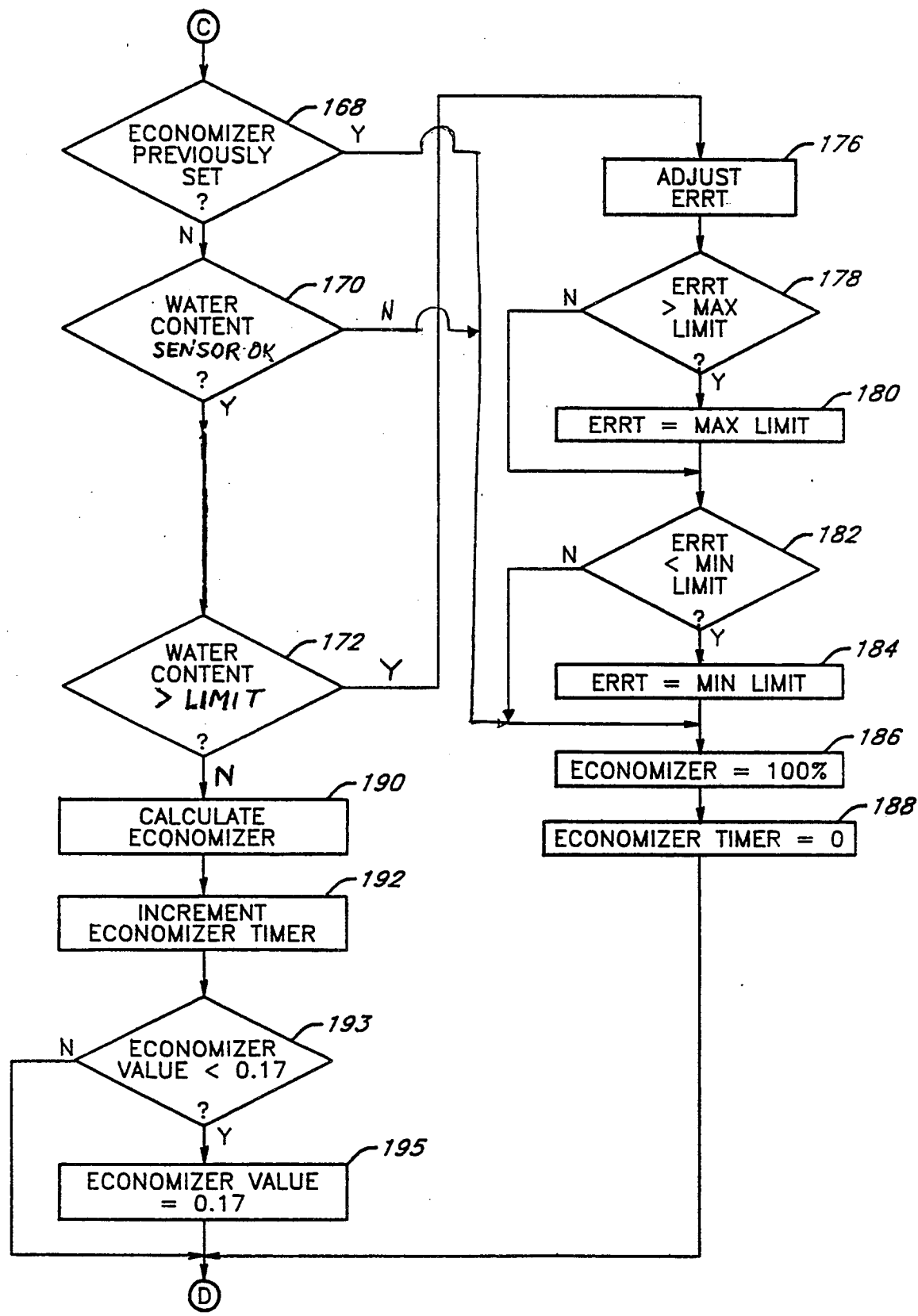

Referring now to FIG. 4D, control proceeds to step 168 where it is determined whether the economizer counter was reset to zero in the previous cycle. If it was previously reset, the control proceeds to step 186. The economizer is maintained at 100% and the timer at 0. If not previously reset, control proceeds to step 170 to determine if the water content sensor is functioning properly. If the sensor is functioning correctly, the control proceeds to step 172 to determine if the water content has exceeded the present threshold; but if the sensor is not functioning correctly, control jumps to reset 186. If the sensor is functioning correctly and the water content is not above the preset threshold, the control proceeds to step 190. If the water content is above the threshold, processing jumps to step 176 to adjust the ERRT. If the ERRT value is high, the economizer value drops slowly, as previously discussed. Conversely, if the ERRT is reduced, the economizer value falls more rapidly.

After the ERRT has been adjusted, control proceeds to step 178 to determine whether the ERRT value has exceeded its preset maximum limit. If so, control proceeds to step 180 and the ERRT is set equal to its maximum limit. Control then proceeds to step 182 to determine whether the ERRT is below its minimum limit. If so, control proceeds to step 184 and the ERRT is set equal to its minimum limit. Control then proceeds to step 186 and the economizer value is reset to 100%, and the economizer timer is reset to zero in step 188.

If none of the above conditions is satisfied, control proceeds to step 190 where the economizer value is calculated according to the time elapsed since the water content exceeded the preset limit, which is indicated by the economizer timer. Control then proceeds to step 192 where the economizer timer is incremented. Control proceeds to step 193 to determine whether the economizer value has dropped below a lower limit. If not, control proceeds to step 194. If the economizer has dropped below the limit, which may be 0.17, for example, control proceeds to step 195. In step 195, the economizer value is set at 0.17, and control proceeds to step 194.

Figure 4E:
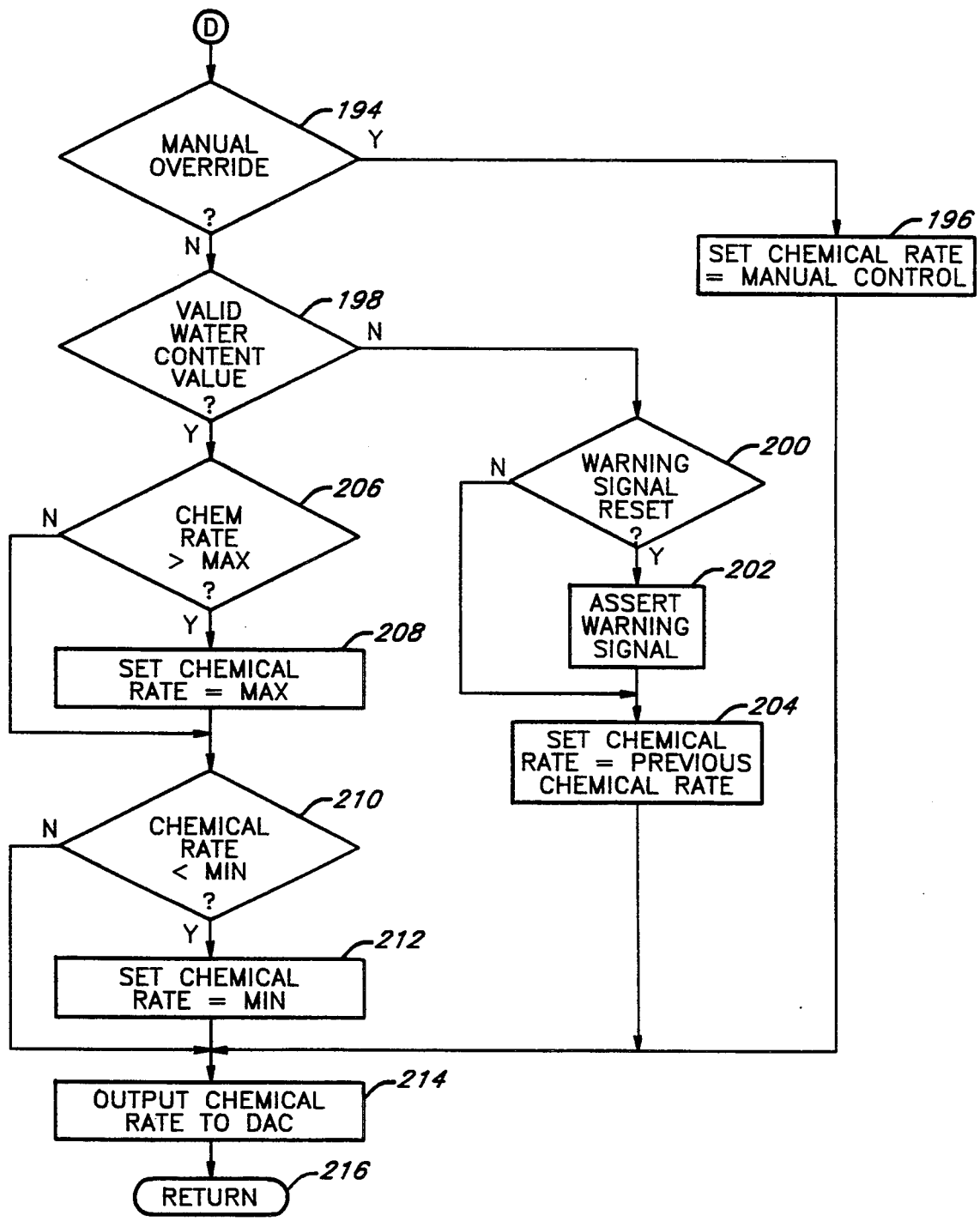

Referring now to FIG. 4E, control proceeds to step 194 to determine whether the manual override signal has been asserted. If so, control proceeds to step 196 and the motor speed is set according to the manual controls. If not, control proceeds to step 198 to determine whether a valid water content value has been determined by checking the water content error flag. If not, control proceeds to step 200 to determine whether a water content error warning signal to the operator has been reset. If so, control proceeds to step 202 and the warning signal is asserted. If not, control proceeds to step 204 and the chemical rate to be used by the system is set equal to the chemical rate calculated in the previous cycle.

If a valid water content value was received, control proceeds to step 206 to determine whether the chemical rate provided exceeds the preset maximum chemical rate. If so, control proceeds to step 208 where the chemical rate is set at the maximum value. Control then proceeds to step 210 to determine whether the chemical rate has dropped below the minimum level. If so, the chemical rate is set at the minimum chemical rate preset value in step 212. Control then proceeds to step 214 where the appropriate chemical rate is provided to the DAC to control the motor rate. Control then proceeds to step 216 and the program returns to the starting step 100.

A treater system according to the above disclosure efficiently treats emulsion, yet reduces the needless consumption of demulsifier when the treater contents do not require further treatment. A treater or any of the other chemical injection processes employing chemical injection may determine a base chemical injection rate based on the flow rate of the fluid through the system and the temperature within the system and may vary the chemical injection rate in response to flow rate through the system, without use of the economizer function. The use of the economizer function then allows the rate of chemical injection to be responsive to effectiveness of the chemical with rate and any other variables included.

EXAMPLE 1

A portable computerized system programmed according to the method of this invention was moved to a crude oil dehydration facility in a Texas oil field. Average oil production through the facility ranged between 450 and 1000 barrels of oil per day (BOD). Water production ranged between 0 and 350 barrels of water per day (BWD). Heater treater temperature was about 130° F. The chemical injection rate which had been used in the facility to produce salable oil before arrival of the portable unit was 4 gallons per day (gal/day).

The crude oil dehydration facility was monitored and controlled using the portable facility. Hoses were attached to permanent flowlines in the dehydration facility to temporarily divert treated emulsion and water streams from the treater through flow meters substantially as shown in FIG. 1. The treated emulsion stream also passed through one of two water content meters which were mounted on a trailer along with a Toshiba EX100 PLC. A relationship between fluid flow rate through the system and chemical injection rate required to produce salable oil at the treater temperature was developed from field experience. Output from the control system was applied to a motor controller which controlled a DC motor driving a pump for de-emulsifier chemical.

Figure 5:
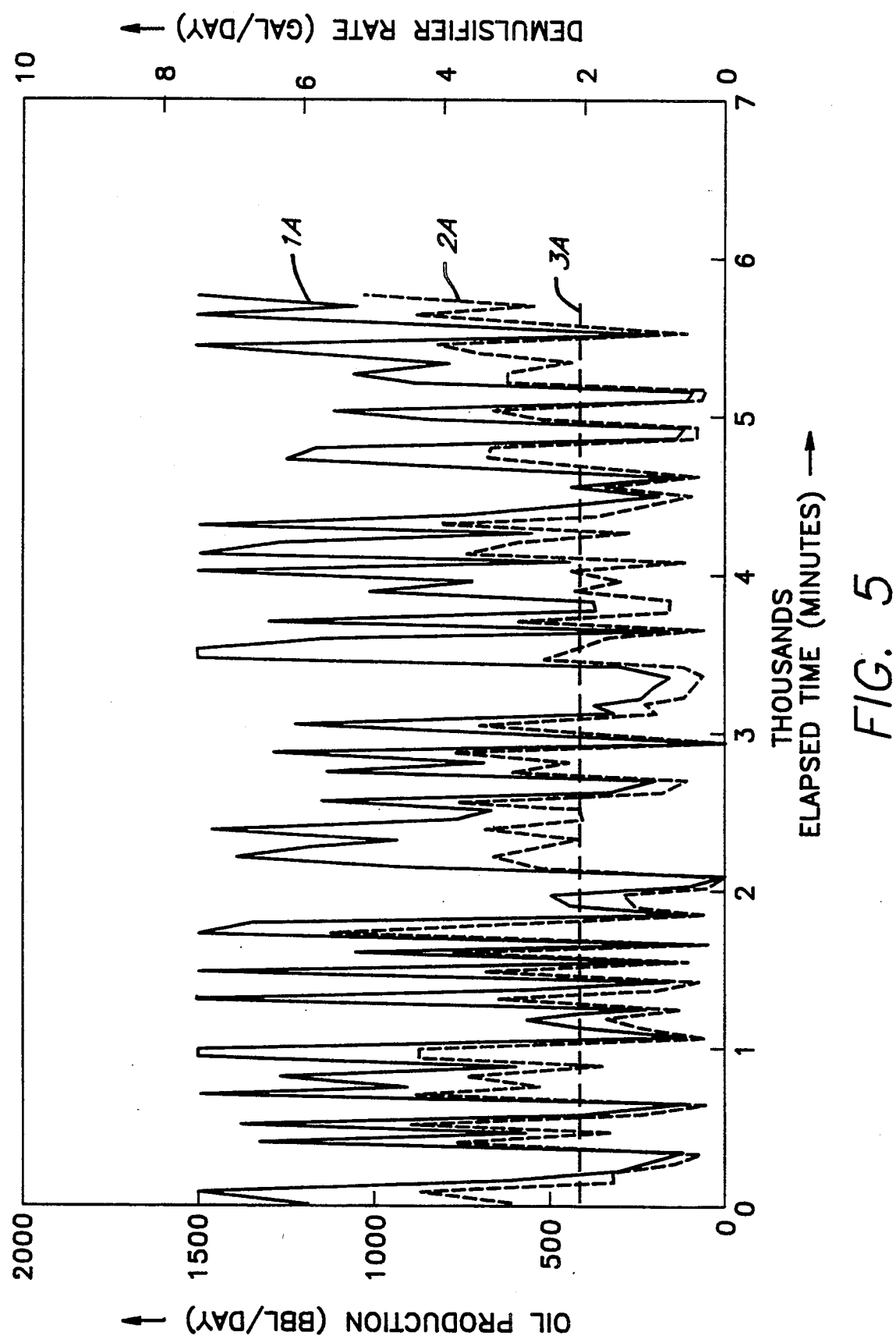
FIG. 5 is a graph of oil flow rate and chemical injection rate vs. time without the economizer function of this invention.

FIG. 5 shows data from the crude oil dehydration system when chemical injection rate was responsive only to variations in flow rate through the facility. Curve 1A is oil flow rate. Curve 2A is chemical injection rate. Curve 3A is the average chemical injection rate over the period shown of about 5,800 minutes or 4 days. The chemical injection rate for this period was reduced to 2.1 gallons per day, which was almost a 50 per cent reduction from the initial value of 4 gallons per day.

Figure 6:
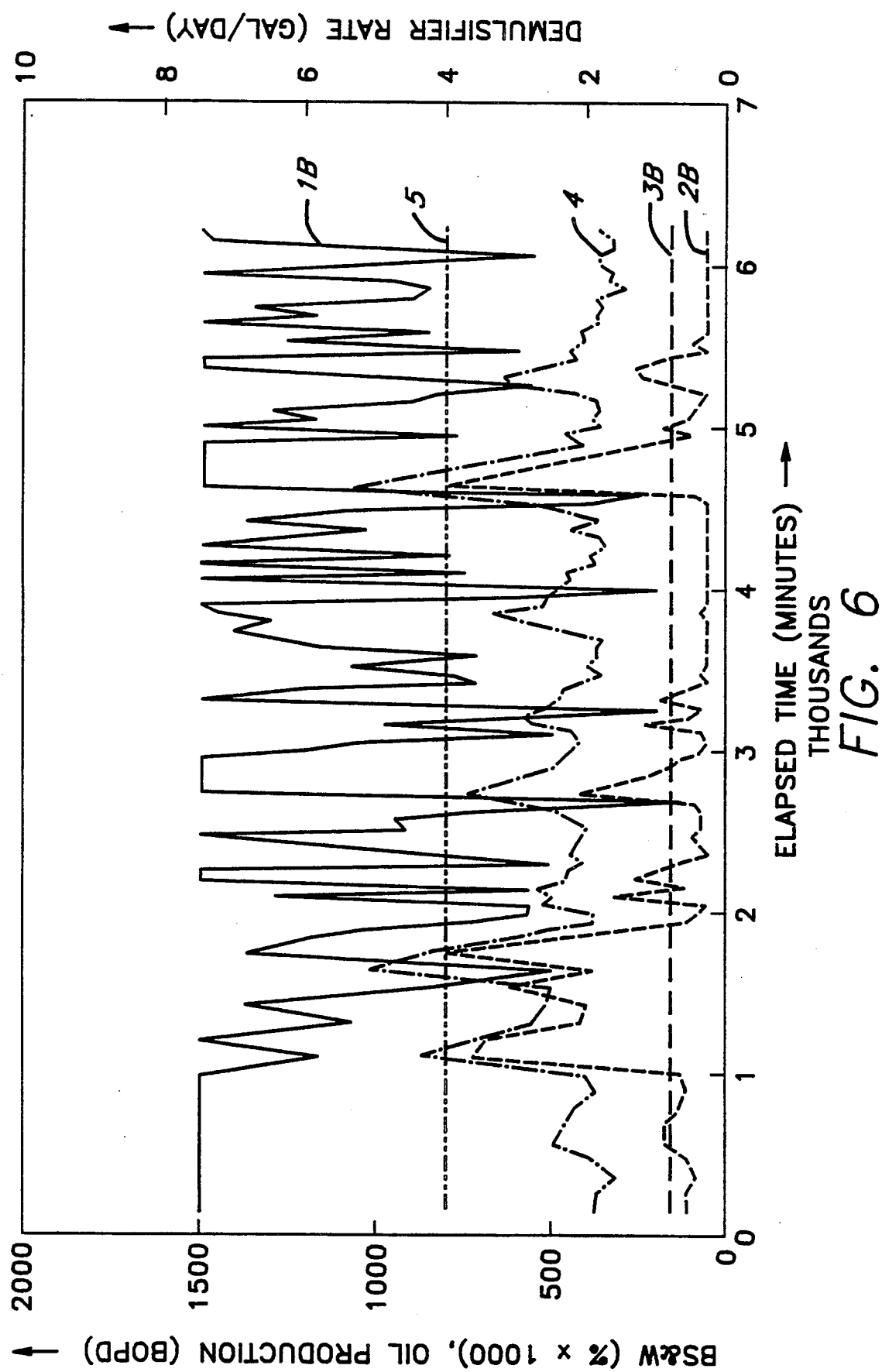
FIG. 6 is a graph of oil flow rate, water content of oil after treatment, water threshold value set, and chemical injection rate vs. time with the economizer function of this invention operating.

Referring to FIG. 6, results with the economizer function applied are shown. The value of ERRT is set at 6. The value of b is set at 0.99978. Curve 1B shows oil or treated emulsion flow rate from the treater. Curve 2B shows chemical injection rate. Curve 3B shows average chemical injection rate over the period shown of about 1800 minutes or 1.25 days. Curve 4 shows water content of the treated emulsion, which is commonly denoted "BS & W" in the industry ("bottom settlings and water"). Curve 5 is the preset value of maximum water content before the economizer is re-set to a value of one, which was 0.8 per cent.

Oil or treated emulsion flow rate fluctuated widely during the time for which data are shown in FIG. 6, just as noted above for the conditions shown in FIG. 5. Variations in chemical injection rate, however, were less pronounced in FIG. 6 than in FIG. 5, although chemical injection rates were clearly influenced by changes in the oil flow rate. In addition, chemical injection rate was influenced by variations in the water content of the emulsion. When water content exceeded the 0.8% threshold, the economizer function was reset so that the base chemical injection rate was provided to the injection pump. The chemical injection rate increased significantly when the water content value exceeded the threshold due to the reset of the economizer value. As long as the water content remained at an acceptable value, however, the control system tended to minimize the chemical injection rate until the water content exceeded the threshold. The average chemical injection rate for the system of FIG. 6 (Curve 3B) was only 0.8 gallons per day. Thus, the treater system performed the dehydration function within the required specifications and the amount of demulsifier required was reduced by the method and apparatus of this invention from 4 gallons per day to 0.8 gallons per day, which amounts to an 80 per cent reduction in chemical usage.

It is apparent that many modifications and variations of this invention as hereinabove set forth may be made without departing from the spirit and scope thereof. The specific embodiments described are given by way of example only and the invention is limited only by the terms of the appended claims.

We claim:

1. (amended) Apparatus for controlling the rate of chemical injection into a stream, the chemical being used to control a measurable variable, comprising:
   means for measuring the variable controlled by the chemical;
   means for comparing the variable controlled with a preset value;
   means for timing to determine the number of time units since the variable exceeded the preset value; and
   means for producing a control signal for adjusting the chemical injection rate according to an algorithm based on the number of time units since the variable exceeded the preset value.

2. The apparatus of claim 1 further comprising means for storing measurements of chemical injection rate and the values of the measurable variable controlled.

3. The apparatus of claim 2 further comprising means for retrieving and communicating the stored data.

4. The apparatus of claim 1 further comprising means for controlling a second variable at a preset value and programming changes of the second variable to a new preset value at a preset time.

5. The apparatus of claim 4 wherein the second variable is temperature.

6. The apparatus of claim 1 wherein the algorithm has the form:

$$e(t) = b^{x(t)},$$

where e(t) is an economizer term,
b is a number selected to have a value between 0 and 1.0, and
x is a number supplied by the means for timing.

7. The apparatus of claim 6 wherein the real time between increments in the value of x is preset.

8. The apparatus of claim 6 wherein x is varied according to a function of the amount of time since the variable controlled exceeded a preset value.

9. Apparatus for controlling the rate of chemical injection into a crude oil stream flowing through a dehydration facility having a dehydration vessel comprising:
   means for measuring water content in the treated crude oil effluent from the dehydration vessel;
   means for comparing the water content of the effluent crude oil to a preset value;
   means for measuring flow rate of crude oil through the dehydration vessel;
   means for timing for determining the number of time units since the water content value exceeded the preset value; and
   means for producing a control signal for adjusting the chemical injection rate according to an algorithm based on the number of time units since water content value exceeded the preset value and the flow rate of crude oil through the dehydration vessel.

10. The apparatus of claim 9 further comprising means for measuring temperature in the dehydration vessel.

11. The apparatus of claim 9 further comprising means for storing data from the measurements.

12. The apparatus of claim 11 further comprising means for retrieving and communicating the stored data.

13. The apparatus of claim 9 further comprising means for controlling a second variable at a preset value and programming changes of the second variable to a new preset value at a preset time.

14. The apparatus of claim 13 wherein the second variable is temperature.

15. The apparatus of claim 9 wherein the algorithm has the form:

$$e(t) = b^{x(t)},$$

where e(t) is an economizer term,
b is a number selected to have a value between 0 and 1.0, and
x is a number supplied by the means for timing.

16. The apparatus of claim 15 wherein the real time between increments in the value of x is preset.

17. The apparatus of claim 15 further comprising means for varying the real time between increments in the value of x is according to a function of the amount of time since the variable to be controlled exceeded a preset value.

18. A computer-implemented method for changing a signal to control the rate of chemical injection into a stream, the chemical being used to control a measurable variable, comprising:
   measuring the variable to be controlled by the chemical;
   comparing the measured values of the variable to be controlled with a preset value;

when the measured value of the variable does not exceed the preset value, determining the number of time units since the variable exceeded the preset value;

applying an algorithm which changes the signal such as to decrease the rate of chemical injection in response to the amount of time since the variable exceeded the preset value, and when the measured value of the variable exceeds the preset value applying an algorithm which changes the signal such as to increase the rate of chemical injection.

19. The method of claim 18 further comprising the steps of storing and retrieving data from measurements of the variable to be controlled.

20. The method of claim 18 wherein the algorithm applied which changes the signal such as to decrease the rate of chemical injection has the form:

$$e(t) = b^{x(t)},$$

where e(t) is an economizer term, b is a number selected to have a value between 0 and 1.0, and x is a number supplied by a timer.

21. The method of claim 20 wherein the value of b is between 0.9 and 1.0.

22. The method of claim 20 wherein the timer is set to increment the value of x at a constant difference in real time.

23. The method of claim 20 further comprising furnishing a signal to the timer to vary the difference in real time when the value of x is incremented, the signal being a function of the real time since the variable to be controlled exceeded the preset value.

24. A computer-implemented method for controlling the rate of chemical injection into a crude oil dehydration facility having a dehydration vessel comprising:

providing the computer with a data base defining the relationship between a base rate of chemical injection and flow rate of crude oil through the dehydration facility;

measuring the flow rate of crude oil through the facility;

repetitively performing in the computer a calculation of base rate of chemical injection;

initiating in the computer a timer which increments at preset amounts of real time;

employing the number of increments of the timer in an algorithm to calculate an economizer function having a value less than 1.0;

repetitively multiplying in the computer the base rate of chemical injection by the economizer function to calculate an adjusted rate of chemical injection; and supplying a signal to a variable rate pump to pump chemical at the adjusted rate.

25. The method of claim 24 further comprising repetitively determining the amount of real time since the water content preceded a preset value and calculating a new value of the time unit of the timer according to a function entered into the computer by an operator.

* * * * *